April 28, 1942. O. D. GRAY 2,280,821
NUT
Filed March 27, 1939
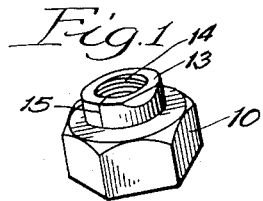
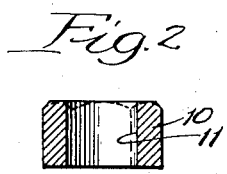
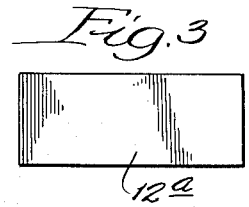
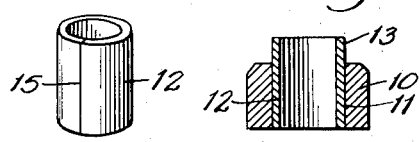
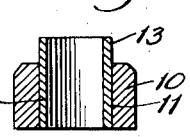
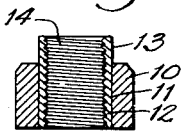
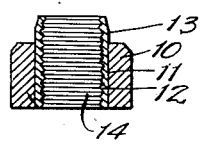
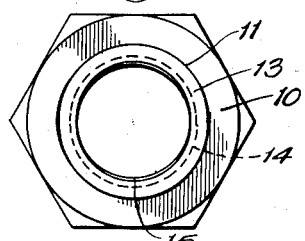
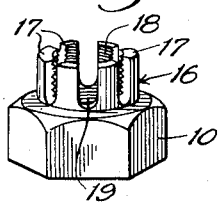
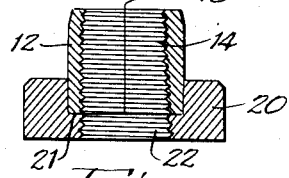
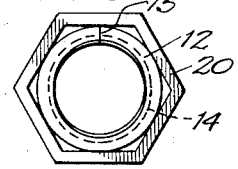
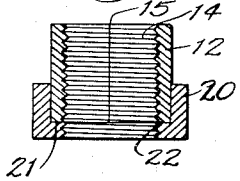
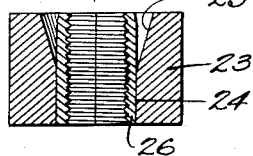
Inventor:
Orrin D. Gray,
By Stenning & Stenning
Attorneys Patented Apr. 28, 1942

2,280,821

UNITED STATES PATENT OFFICE 2,280,821

NUT

Orrin D. Gray, Chicago, Ill.

Application March 27, 1939, Serial No. 264,310

6 Claims. (Cl. 10—86)

The present invention relates to nuts and to a method for the manufacture thereof. It is concerned primarily with a nut which may be produced at low cost; which will possess ample strength to meet service conditions; which comprises two parts each of a material and form to best meet the conditions of use; which may be expeditiously and permanently assembled, and which may take various forms, as for example a lock nut, a castellated nut, etc.

A nut made in accordance with this invention is exemplified by the showings in the accompany drawing, wherein, Figure 1 is a view in perspective of the complete nut;

Fig. 2 is a central longitudinal section through the body component of the nut;

Fig. 3 is a development view of the blank from which the insert is formed;

Fig. 4 is a view in perspective of the blank rolled into the form of a cylindrical insert;

Fig. 5 is a central longitudinal section through the body and insert components of the nut in assembled relation but before threading;

Fig. 6 is a similar view showing the nut in the next stage of its manufacture, viz., with the insert interiorly threaded to cooperate with the threads of an intended bolt;

Fig. 7 is a similar view showing the protruding end of the insert as distorted to produce in effect a slightly oval contour upon the interior thereof;

Fig. 8 is a top plan view of the nut;

Fig. 9 is a view similar to Fig. 1, showing a castellated nut;

Fig. 10 is a view of the blank from which is formed the insert of the castellated nut of Fig. 9;

Fig. 11 is a central longitudinal section through a nut whose body component is modified to the extent of providing therein a shoulder against which is rested the inner end of the insert component;

Fig. 12 is a plan view of a nut whose body may be cupped from sheet metal, the insert being slightly distorted out of round;

Fig. 13 is a sectional view of the nut shown in Fig. 12; and

Fig. 14 is a central longitudinal section through a nut having a body whose axial opening is outwardly tapered in one end region, adapting it to receive an insert of equal length whose ends may lie flush with those of the surrounding body.

The nut of Figs. 1 to 8 comprises a body 10 of hexagonal or other conventional form provided from end to end with a bore 11 preferably of cylindrical form into which is fitted a cylindrical insert 12 which terminates at its lower end flush with the base of the nut and which at its upper end 13 projects above the top of the nut. The interior of the insert is provided with threads 14, and the insert is preferably made from a blank 12ª of rectangular shape and rolled to cylinder form to provide a butt joint 15.

In practice, it is preferred to make the body of the nut of ordinary cold rolled mild steel very low in carbon, and the insert is preferably made of spring steel or alloy steel, particularly where it is desired to distort the upper end of the insert as in Fig. 7 to give thereto the slightly oval configuration indicated in Fig. 8, whereby opposite threaded sides thereof are brought slightly closer to each other so as to exert a spring grip upon the threads of a bolt. It is to be understood that the choice of metals for the body and the insert respectively will depend upon the particular use for which the nut is intended, and by making the parts separately the required degree of hardness, toughness, and/or resiliency may be given to the insert.

In producing inserts intended as lock nuts having the distortional features of Figs. 7 and 8, it is desirable to braze or weld the insert within the body and concurrently weld the joint 15 in a controlled temperature of approximately 2300° F. with no oxygen present. The threading may be done either before or after assembly, and the distortion of the protruding end of the insert is preferably performed after the insert is in place. Heat treating to impart the desired spring tension then follows, and by forming the nut in the manner described a high quality of steel may be employed in the threaded portion of the nut only, with the body formed of a cheaper grade of steel adequate for reinforcing the insert and providing a nut of the required bulk and external configuration.

In forming a castellated nut, a body 10 is employed identical with that previously described, and the insert 16 is formed from a blank 16ª having along its upper edge separated tongues 17, which when the blank is rolled to cylindrical form and threaded, extend upwardly from the body and provide an interrupted threading 18 throughout the protruding portion of the insert which merges into the continuous threading 19 within the portion of the insert enclosed by the body. In forming the castellated nut, a notched blank of cold rolled mild steel is employed and inserted into the body and welded and finally tapped from end to end. Where desired, the castellated insert can be welded in place in the manner first described, and the protruding tongues compressed or distorted and heat treated to provide a mild grip on the bolt when the lock nut feature is desired.

Inserts of either form may be inserted into nut bodies 20 of the character shown in Figs. 11 and 13, which are each provided with an interior shoulder or ledge 21 which receives the lower end of the insert, the remainder of the body bore being threaded as at 22 in continuation of the threads on the insert. The nut body of Fig. 11 is provided with a bore which is formed by a pilot punch to provide the ledge, while the body of Fig. 13 is formed by flanging the lower end to form the ledge. Obviously, the nut bodies might be cast or otherwise formed in any desired manner.

In brazing the inserts within the bodies, it is preferred to employ a copper paste or thin strip and subject the nut to a temperature of 2100°–2300° F. for a few minutes, which causes the brazing material to run freely and distribute itself between the contacting surfaces.

In Fig. 14 I have shown a modified form of nut having a body 23 provided with a bore 24 which is outwardly flared or recessed in its upper region to provide a throat or flaring surface 25 in spaced relation to the upper end of the insert 26, which in this instance terminates at each end flush with the body, although obviously the bore of the body at the lower end might be shouldered as in Figs. 11 and 13. The recessing of the nut affords a clearance which thus permits the upper end of the insert to be pinched or distorted inwardly by a suitable tool to a slight degree to produce the gripping effect previously referred to. It will be understood that the methods of forming, welding or brazing and heat treating the nut of Fig. 14 are the same as those employed with relation to the nuts first described.

In applying the nut of the present invention in whichsoever form and in cases where the free end of the insert has been distorted from true circularity, it is possible to employ a wrench having a collet or cam which engages the slightly distorted end of the insert and serves during the screwing operation of application or removal, and by exteriorly applied compression to restore the end of the insert to truly circular form, so that the spring grip will be temporarily relaxed, thereby relieving the threads from excessive friction during the adjustment of the nut.

The nut of the present invention is one which permits each of the constituents to be separately formed to the desired dimensions and from metal selected with especial reference to the purpose intended, so that when assembled the insert will protrude from the body to any desired extent, or not at all as in Fig. 14, thus providing an insert which may be distorted to any suitable degree to afford the amount of spring grip desired.

Although several different modifications involving the principles of the present invention have been shown, it will be understood that other variations in detail may be introduced without departing from the spirit of the invention.

I claim:

1. The method of producing a nut which comprises forming a nut body having an axial bore therein from steel of low carbon content, rolling a flat blank of relatively higher carbon steel into an insert of tubular form and producing a butt joint thereby, introducing the tubular insert into the bore leaving one end of the insert projecting outwardly from the body, concurrently welding the joint of the insert and the contacting portions of the insert and body, forming threads interiorly of the insert coextensively therewith, distorting the free threaded end of the insert to out-of-round configuration, and heat treating the unit this formed to impart resiliency to the high carbon steel insert.

2. The method of producing a castellated nut which comprises forming a body with an axial bore, rolling a blank of cold rolled mild steel and having notches formed in one edge thereof into the form of a tubular insert having the notches at one end thereof and producing a longitudinally extending butt joint thereby, assembling the insert within the body bore with the notched end projecting outwardly of the body, concurrently welding the joint of the insert and the contacting portions of the insert and body, and forming threads interiorly of the insert coextensively therewith.

3. The method of producing a nut which comprises forming a steel nut body having an axial bore therein, rolling a flat blank into an insert of tubular form and producing a butt joint thereby, introducing the tubular insert into the bore, concurrently welding the joint of the insert and the contacting portions of the insert and body, forming threads interiorly of the insert coextensively therewith, and distorting to out-of-round configuration a portion of the insert not in contact with the body.

4. A nut consisting of a body solid throughout except for a cylindrical bore therethrough enlarged in one portion thereof, a tubular insert fitted closely within the body bore with the surface of one for part of its length in contact with the surface of the other for part of its length but each out of contact with the other in the region of the enlarged portion of the bore, the insert in its non-contacting region being distorted to out-of-round configuration whereby to produce transverse major and minor diameters interiorly thereof, one end of the insert proximate to its non-contacting region terminating substantially flush with the adjacent body end, screw threads formed interiorly of the insert and extending for the full length thereof, and means uniting the insert immovably with the body whereby thrust or torsion forces applied to the latter will be transmitted to the former to facilitate advancement or retraction of the nut upon a bolt having cooperating threads while permitting the distorted region of the insert to yield, as required, for resilient gripping of the bolt upon opposite surfaces thereof.

5. As an article of manufacture, a nut consisting of a relatively soft steel body of low carbon content and solid throughout except for a cylindrical bore therethrough, a tubular coextensive and interiorly threaded spring insert of relatively high carbon content closely fitted within the body bore and protruding outwardly thereof at one end, the insert being distorted to out-of-round configuration at its protruding end whereby to produce transverse major and minor diameters interiorly thereof, and means uniting the insert immovably with the body whereby thrust or torsion forces applied to the latter will be transmitted to the former to facilitate advancement or retraction of the nut body upon a bolt having cooperating threads while permitting the distorted end of the insert to yield, as required, for resilient gripping of the bolt upon opposite surfaces thereof.

6. As an article of manufacture, a nut consisting of a relatively soft steel body of low carbon content solid throughout except for a shouldered bore therethrough, and a tubular steel insert of relatively high carbon content closely fitted within the body bore with one of the insert ends abutting against the shoulder and its opposite end protruded outwardly beyond the proximate body end, the interior of the insert and the exposed surface of the bore being continuously and coextensively interiorly threaded and the opposite protruded end of the insert being distorted to out-of-round configuration whereby to produce transverse major and minor diameters interiorly thereof, and means uniting the insert immovably with the body whereby thrust or torsion forces applied to the latter will be transmitted to the former to facilitate advancement or retraction of the nut upon a bolt having cooperating threads while permitting the distorted end of the insert to yield, as required, for resilient gripping of the bolt upon opposite surfaces thereof.

ORRIN D. GRAY.